(12) United States Patent
Roethling et al.

(10) Patent No.: US 9,643,315 B2
(45) Date of Patent: May 9, 2017

(54) DEVICE AND METHOD FOR PROGRAMMING A HANDLING APPARATUS

(75) Inventors: Frank Roethling, Schwieberdingen (DE); Sven Dose, Bruchsal (DE); Andreas Rueb, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/995,061

(22) PCT Filed: Dec. 9, 2011

(86) PCT No.: PCT/EP2011/072334
§ 371 (c)(1),
(2), (4) Date: Sep. 3, 2013

(87) PCT Pub. No.: WO2012/080127
PCT Pub. Date: Jun. 21, 2012

(65) Prior Publication Data
US 2013/0338830 A1    Dec. 19, 2013

(30) Foreign Application Priority Data

Dec. 16, 2010   (DE) .......................... 10 2010 063 222

(51) Int. Cl.
*B25J 13/00*    (2006.01)
*B25J 9/16*    (2006.01)
*G05B 19/423*    (2006.01)

(52) U.S. Cl.
CPC ............ *B25J 9/161* (2013.01); *G05B 19/423* (2013.01); *G05B 2219/36433* (2013.01)

(58) Field of Classification Search
CPC .................. B26J 9/161; G05B 19/423; G05B 2219/36433; G05B 19/421; G05B 19/425;
(Continued)

(56) References Cited

U.S. PATENT DOCUMENTS 5,495,410 A * 2/1996 Graf ...................... B25J 9/1671
                                                    318/568.11
5,937,143 A * 8/1999 Watanabe .............. B25J 9/1671
                                                    700/264
(Continued)

FOREIGN PATENT DOCUMENTS

DE    10 2007 062 108    7/2009
EP         1 724 676     11/2006
(Continued)

OTHER PUBLICATIONS

International Search Report, PCT International Application No. PCT/EP2011/072334, dated Apr. 3, 2012.

*Primary Examiner* — Stephen Holwerda
(74) *Attorney, Agent, or Firm* — Norton Rose Fulbright US LLP

(57) ABSTRACT

A device for programming an handling apparatus, an industrial robot in particular, having an operating unit situated on an arm of the handling apparatus, which is able to be moved by an operator for programming motion sequences together with the arm to different positions, especially processing positions, having input devices on the operating unit for detecting at least positions of the arm, preferably in the form of input keys, the operating unit being connected to a control device for the handling apparatus; and data transmitted via input devices of the operating unit to the control device being displayed to the operator via a monitoring unit. The input devices are additionally used for controlling and operating display menus and input menus stored in the control device, the display menus and the input menus being displayed on the monitoring unit.

21 Claims, 1 Drawing Sheet

(58) Field of Classification Search
CPC ...... G05B 19/427; G05B 19/409; B25J 13/02; B25J 13/025; B25J 13/06; B25J 13/065; B25J 9/1674; B25J 9/1656; B25J 9/1661; B25J 9/1664
USPC ................................ 700/250, 254, 257, 264
See application file for complete search history.

(56) References Cited

U.S. PATENT DOCUMENTS

| | | | | |
|---|---|---|---|---|
| 6,212,443 | B1* | 4/2001 | Nagata | G05B 19/423 318/568.13 |
| 2004/0068335 | A1* | 4/2004 | Ferla | B25J 13/06 700/86 |
| 2004/0212626 | A1* | 10/2004 | Lyxzen | G06F 3/0481 345/589 |
| 2005/0080515 | A1* | 4/2005 | Watanabe | B25J 9/1671 700/264 |
| 2005/0154295 | A1* | 7/2005 | Quistgaard | A61B 5/6843 600/424 |
| 2008/0161964 | A1* | 7/2008 | Irie | B23K 26/0884 700/166 |
| 2009/0289591 | A1* | 11/2009 | Kassow | B25J 19/0004 318/568.13 |
| 2010/0145520 | A1* | 6/2010 | Gerio | B25J 13/06 700/264 |
| 2010/0312392 | A1 | 12/2010 | Zimmermann | |

FOREIGN PATENT DOCUMENTS

| | | |
|---|---|---|
| JP | 3-218502 | 9/1991 |
| JP | 2008-110406 | 5/2008 |
| JP | 2009-181526 | 8/2009 |
| JP | 2010-269419 | 12/2010 |
| WO | WO 2007/099511 | 9/2007 |

* cited by examiner

DEVICE AND METHOD FOR PROGRAMMING A HANDLING APPARATUS

FIELD

The present invention relates to a device and a method for programming an handling apparatus, particularly an industrial robot.

BACKGROUND INFORMATION

A device and a method for programming a handling apparatus are described in German Patent Application No. DE 10 2007 062 108 A1. In the conventional device and the conventional method it is provided that a handle movable by an operator be situated at the end of an arm of an industrial robot, the movement of the handle resulting in a corresponding movement of the arm of the industrial robot. It is further provided that an input device, e.g., keys, be situated on the handle. It is thereby possible, in order to program a certain path of motion of the robot arm, which is, for instance, required to join together component parts, to teach the path of motion, by the operator's guiding the robot arm manually, and, at certain positions, specifying a stopping point, via the input device, such as a control device. The controller of the industrial robot is thus able to learn and store the path of motion of the robot arm that was carried out manually by the operator. The conventional device also has a screen, via which the measured forces are able to be displayed.

Moreover, one may situate such a screen or monitor at a distance from the robot arm and from the operating unit. If different operating types or functions are to be called up or rather dialed up in the programming of the handling apparatus, it is necessary for the operator to remove at least one hand, but usually both hands from the arm of the industrial robot, in order to key in an appropriate new input, via an externally mounted keyboard, for instance, in an input menu. Such a procedure means an increased time expenditure during the learning of movement processes, and in addition, it involves the danger that the last-detected position of the arm of the industrial robot becomes affected or corrupted by the releasing of the arm by the operator.

SUMMARY

An object of the present invention is to refine a device and a method for programming an handling apparatus, especially of an industrial robot, in such a way that particularly rapid and clear-cut programming is made possible. In accordance with the present invention, the operating unit or its input devices, situated on the arm of the handling apparatus, are used additionally for controlling the display menus and input menus stored in the control device of the handling apparatus, the display menus and the input menus being displayed on the monitor unit. Consequently, it is not required in any phase of the programming, to remove one or both hands from the arm of the handling apparatus, in order to call up different display and input menus in the control device or to operate them.

The framework of the present invention encompasses all combinations of at least two of the features described below or shown in the figures.

On the one hand, in order to minimize the constructive expenditure of the operating unit and, on the other hand, to enable as compact an operating unit as possible, it is provided in one preferred embodiment of the present invention, that the input device for detecting at least of positions of the arm and for controlling the display menus and the input menus stored in the control device are the same input devices.

In this context, it is particularly provided that the input device for the selection of input fields within a display mask is used to confirm or break off dialogs, to confirm selection options, for operating a screen keyboard, for scrolling selection lists or display masks up and down, or to carry out file operations. In other words, this means that, using the device according to the present invention, all the usually required operations are able to be carried out using the input device, without the operator's having to take a hand off the arm of the handling apparatus.

In order to make possible for the operator as simple as possible an operation and recognizability of the monitor unit, in one preferred embodiment of the present invention it is additionally provided that the monitor unit be fastened on the arm or the operating unit, or that the monitor unit be situated in a swiveling manner on a base of the handling apparatus. Thereby, it is made possible, during the entire movement of the robot arm, that the operator is able to glance at the monitor unit.

In case the monitor unit is situated on the base of the handling apparatus, it is possible to equip the monitor unit with an adjusting device, which tracks or adjusts the monitoring unit to the position of the arm. This makes possible for the operator a better recognizability of the monitor unit at different positions of the arm.

Furthermore, it is advantageous, if the input devices are situated in a multiple way on the operating unit. This makes it possible for the operator to grasp the arm of the handling apparatus from different sides, and still to find, in each case, input means that are easy to reach and to operate.

The present invention also includes an handling apparatus, particularly an industrial robot, having a device according to the present invention for programming. Such an handling apparatus stands out in having a particularly simple operation and a particularly rapid learning of new motion sequences.

Additional advantages, features and details of the present invention derive from the description below of preferred exemplary embodiments as well as from the figures.

DETAILED DESCRIPTION OF EXAMPLE EMBODIMENTS

Figure 1:
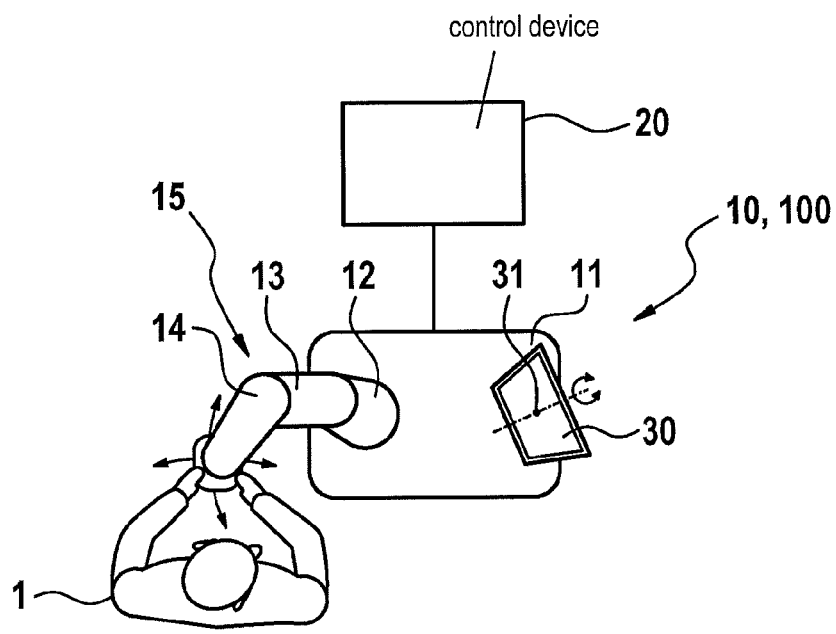
FIG. 1 shows a simplified, schematic top view of an handling apparatus in the form of an industrial robot.

The same components and components having the same function are provided with the same reference numerals in the figures.

In the figures, a handling apparatus 10 is shown in the form of an industrial robot 100. Using handling apparatus 10, components in a manufacturing process may be handled particularly in automatic fashion, for instance, positioned with respect to each other, joined, or the like.

Figure 2:
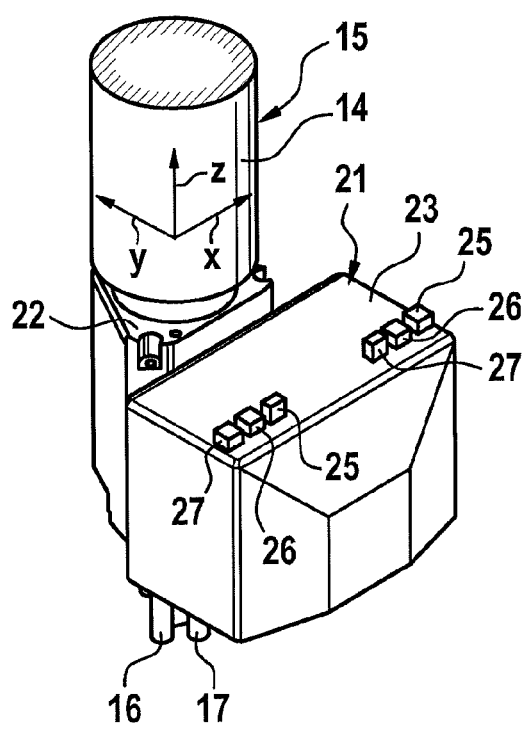
FIGS. 2 and 3 show respective views of the end of a robot arm, as is used in an handling apparatus according to FIG. 1, having an operating unit for programming the handling apparatus from different perspectives.
Figure 3:
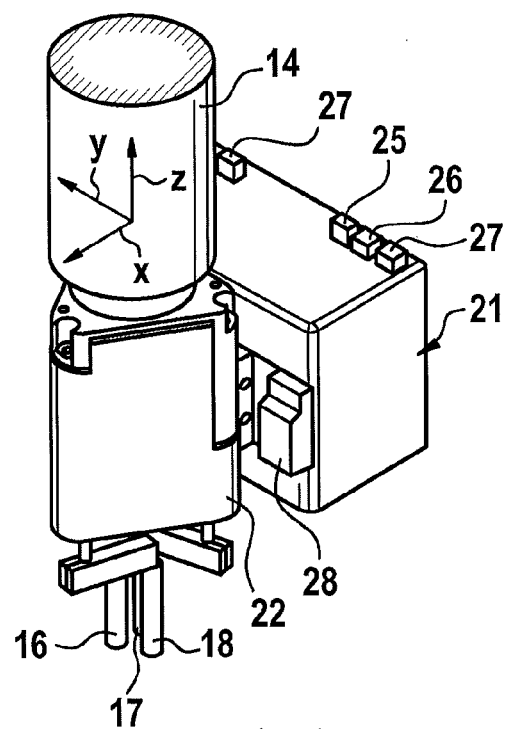

Handling apparatus 10 has a device base 11, from which a robot arm 15, having three robot arm members 12 through 14 in the exemplary embodiment is situated. The end of robot arm 15 opposite to device base 11 has, for instance, three grasping fingers 16 to 18, that are shown in FIGS. 2 and 3, which are used for holding or grasping objects that are not shown. The robot arm members 12 to 14, that are situated swivelably in the usual manner, are situated so that, particularly using grasping fingers 16 to 18, every point in the space in the action radius of handling apparatus 10 is able to be encountered.

The encountering or the actuation of robot arm 15, as well as additional functions of handling apparatus 10 take place using a control device 20, which is shown in FIG. 1 only schematically.

For programming or teaching new handling processes, such as the teaching of a path of motion of robot arm 15, which is required to pick up an object, for instance, from a first position in space and to put it down at a second location located in another position in space, it is required to specify such a path of motion to robot 15. For this purpose, control device 20 has a programming mode. This programming mode provides that robot arm 15 is able to be manually moved by an operator 1 along the three spatial axes x, y and z shown in FIGS. 2 and 3, either the complete path of motion or at least several positions on the path of motion of robot arm 15 being able to be recorded and stored by control device 20. This recording and storing of positions takes place particularly by operator 1, who operates for this an operating unit 21 situated on robot arm 15, and especially on robot arm member 14.

As may be recognized particularly with the aid of FIGS. 2 and 3, operating unit 21 is fastened exchangeably on the end of robot arm 15, barely above grasping fingers 16 to 18, on a carrier device 22. For this purpose, carrier device 22 has an interface not shown in greater detail, which makes possible a mechanical as well as an electrical connection of operating unit 21 to robot arm 15, and also to control device 20. It is preferably provided that operating unit 21 be connected to robot arm 15 only for programming handling apparatus 10.

As may also be recognized particularly with the aid of FIG. 1, operating unit 21 is able to be grasped manually by operator 1 using both his hands, the situation of operating unit 21 being such that operator 1 is able to move operating unit 21 together with robot arm 15 in such a way that the path of motion that is desired, or rather to be taught, will set in.

Referring to the two FIGS. 2 and 3, one may further see that, on the upper side 23 of operating unit 21, two groups each having three identically developed operating keys 25 to 27 are situated, each for the same functions. The doubled or redundant situation of operating keys 25 to 27 enable operator 1 to grasp robot arm 15 from different positions or situations, whereupon, independently of the situation or the position of operator 1, in each case one group of operating keys 25 to 27, used as input devices, is operable by operator 1, without his having to take a hand away from operating unit 21 for this, or having to reposition this hand. Operating keys 25 to 27 are preferably situated near robot arm 15.

Furthermore, on the side of operating unit 21 facing carrier element 22, one may see laterally an additional operating key 28, which is preferably also provided to be redundant (and which cannot be seen in the figures). Using additional operating key 28, it is possible, for example, to set robot arm 15 to be force-free, so that it is able to be positioned by operator 1 to the desired position in space using relatively little expenditure of force.

Operating keys 25 to 28 described above, fulfill a double function according to an example embodiment of the present invention: For one thing, they are used to inform control device 20 of handling apparatus 10 of certain positions in space, by operating them, or transmitting these to control device 20, or even to make possible the motion of robot arm 15 that was addressed. For another, operating keys 25 to 28 are used in part to actuate, select or operate different additional functions of control device 20.

It is preferably provided that the functions addressed be operable in a manner controlled by the screen. To do this, a monitoring unit 30 is positioned in a swivelable manner on housing base 11, for example, in a vertically situated axis of rotation 31. The ability to be swiveled of monitoring device 30 makes it possible for operator 1 to cast a free glance onto monitoring unit 30 from any position, by moving robot arm 15. To do this, it may possibly also be provided that monitoring device 30 be connected to an adjusting device (not shown) which, as a function of the position of robot arm 15 effects an appropriate rotation of monitoring unit 30 in axis of rotation 31, in such a way that operator 1 is always able to maintain visual contact with monitoring unit 30.

Alternatively, it is also possible that monitoring unit 30 is able to be situated either on robot arm 15 itself, or on operating unit 21.

Using operating keys 25 to 28, it is possible to use these as input means for the selection of input fields within a screen mask, for confirming or breaking off dialogs, for confirming selection options, for operating a screen keyboard, for scrolling up or down on selection lists or screen masks, for carrying out file operations (loading or storing data) or the like, which are displayed on monitoring unit 30. Consequently, according to an example embodiment of the present invention, it is not required that operator 1 remove a hand from operating unit 21 for calling up or confirming the individual menu functions of a program of control device 20.

Handling apparatus 10 described up to this point, and its operating unit 21 may be adapted or modified in various ways, without deviating from the idea of the present invention. This idea is that operating unit 21 and its operating keys 25 to 28 fulfill a multiple function, and in particular are also used to conduct a menu-guided input/output dialog with control device 20, via a monitoring unit 30.

What is claimed is:

1. A device for programming a handling apparatus, comprising:
    an operating unit situated on an arm of the handling apparatus, wherein the operating unit is movable by an operator for programming motion sequences together with the arm to different positions, and wherein a plurality of input devices are provided on the operating unit;
    a control device, wherein the operating unit is connected to the control device;
    a monitoring unit, wherein the monitoring unit displays display menus and input menus stored in the control device and data transmitted by at least one of the input devices to the control device; and
    wherein at least one of the plurality of input devices is configured to perform the following:
        detect positions of the arm;
        control and operate the display menus and the input menus; and
        at least one of select input fields within a display mask, confirm or break off dialogs, confirm selection options, operate a screen keyboard, and scroll selection lists or display masks up and down;
    wherein the handling apparatus has a grasping arrangement situated on the arm below the operating unit, wherein the operating unit is fastened exchangeably on the end of the arm above the grasping arrangement by a carrier device, which includes an interface to provide mechanical connection of the operating unit to the arm and to the control device, wherein the operating unit is manually movable by the operator, so that the operator is able to move the operating unit together with the arm so that a desired path of motion is set, and wherein the operating unit includes at least two groups of operating keys, which enable the operator to grasp the arm from different positions or situations, so that, independently of a position of the operator, in each case one of the groups of operating keys is operable by the operator without the operator having to take a hand away from the operating unit or having to reposition the hand.

2. The device as recited in claim 1, wherein the handling apparatus is a robot.

3. The device as recited in claim 1, wherein at least one of the plurality of input devices is situated close to the arm.

4. The device as recited in claim 1, wherein at least one of: i) the monitoring unit is fastened on the arm and on the operating unit; and ii) the monitoring unit is situated in a swivelable manner on a base of the handling apparatus.

5. The device as recited in claim 4, wherein there are redundant input devices on the operating unit.

6. The device as recited in claim 1, wherein the monitoring unit is situated in a swivelable manner on a base of the handling apparatus, and wherein the monitoring unit is equipped with an adjusting device which tracks or adjusts the monitoring unit to the position of the arm.

7. The device as recited in claim 1, wherein at least one of the plurality of input devices is configured to select the input fields within the display mask.

8. The device as recited in claim 1, wherein at least one of the plurality of input devices is configured to confirm or break off the dialogs.

9. The device as recited in claim 1, wherein at least one of the plurality of input devices is configured to confirm the selection options.

10. The device as recited in claim 1, wherein at least one of the plurality of input devices is configured to operate the screen keyboard.

11. The device as recited in claim 1, wherein at least one of the plurality of input devices is configured to scroll the selection lists or the display masks up and down.

12. The device as recited in claim 1, wherein the operating unit is fastened exchangeably on the end of the arm above the grasping arrangement by the carrier device, which includes the interface to provide mechanical connection and electrical connection of the operating unit to the arm and to the control device.

13. A method for programming a handling apparatus, the method comprising:
operating display menus and input menus stored in a control device using an operating unit, the display menus and the input menus being displayed on a monitoring unit;
wherein the operating unit is situated on an arm of the handling apparatus for programming motion sequences of the arm, the operating unit having at least one input device that is manually operable by an operator, and the monitoring unit displays to the operator data transmitted to the control device; and
wherein at least one of the input devices is configured to perform the following:
select input fields within a display mask,
confirm or break off dialogs,
confirm selection options,
operate a screen keyboard, and
scroll selection lists or display masks up and down;
wherein the handling apparatus has a grasping arrangement situated on the arm below the operating unit,
wherein the operating unit is fastened exchangeably on the end of the arm above the grasping arrangement by a carrier device, which includes an interface to provide mechanical connection of the operating unit to the arm and to the control device,
wherein the operating unit is manually movable by the operator, so that the operator is able to move the operating unit together with the arm so that a desired path of motion is set, and
wherein the operating unit includes at least two groups of operating keys, which enable the operator to grasp the arm from different positions or situations, so that, independently of a position of the operator, in each case one of the groups of operating keys is operable by the operator without the operator having to take a hand away from the operating unit or having to reposition the hand.

14. The method as recited in claim 13, wherein the handling apparatus is an industrial robot.

15. The method as recited in claim 13, wherein at least one of the plurality of input devices is situated close to the arm.

16. The method as recited in claim 15, wherein there are redundant input devices on the operating unit.

17. The method as recited in claim 13, wherein at least one of: i) the monitoring unit is fastened on the arm and on the operating unit; and ii) the monitoring unit is situated in a swivelable manner on a base of the handling apparatus.

18. The method as recited in claim 13, wherein the monitoring unit is situated in a swivelable manner on a base of the handling apparatus, and wherein the monitoring unit is equipped with an adjusting device which tracks or adjusts the monitoring unit to the position of the arm.

19. The method as recited in claim 13, wherein the operating unit is fastened exchangeably on the end of the arm above the grasping arrangement by the carrier device, which includes the interface to provide mechanical connection and electrical connection of the operating unit to the arm and to the control device.

20. A handling apparatus, comprising:
an arm;
an operating unit situated on the arm, the operating unit and the arm are movable by an operator for programming motion sequences;
a plurality of input devices on the operating unit;
a control device connected to the operating unit; and
a monitoring unit;
wherein:
the monitoring unit displays:
data transmitted via at least one of the plurality of input devices to the control device; and
display menus and input menus stored in the control device;
at least one of the plurality of input devices is configured for controlling and operating the display menus and the input menus; and
at least one of the input devices is configured to perform the following:
select input fields within a display mask,
confirm or break off dialogs,
confirm selection options, operate a screen keyboard, and scroll selection lists or display masks up and down;

wherein the handling apparatus has a grasping arrangement situated on the arm below the operating unit, wherein the operating unit is fastened exchangeably on the end of the arm above the grasping arrangement by a carrier device, which includes an interface to provide mechanical connection of the operating unit to the arm and to the control device, wherein the operating unit is manually movable by the operator, so that the operator is able to move the operating unit together with the arm so that a desired path of motion is set, and wherein the operating unit includes at least two groups of operating keys, which enable the operator to grasp the arm from different positions or situations, so that, independently of a position of the operator, in each case one of the groups of operating keys is operable by the operator without the operator having to take a hand away from the operating unit or having to reposition the hand.

21. The handling apparatus as recited in claim 20, wherein the operating unit is fastened exchangeably on the end of the arm above the grasping arrangement by the carrier device, which includes the interface to provide mechanical connection and electrical connection of the operating unit to the arm and to the control device.

* * * * *